(12) United States Patent
Walker et al.

(10) Patent No.: US 7,806,320 B2
(45) Date of Patent: *Oct. 5, 2010

(54) METHOD AND APPARATUS FOR PROMOTING THE SELECTION AND USE OF A TRANSACTION CARD

(75) Inventors: Jay S. Walker, Ridgefield, CT (US); Bruce Schneier, Minneapolis, MN (US); Magdalena M. Fincham, Ridgefield, CT (US); James A. Jorasch, Stamford, CT (US); Michael D. Downs, Stamford, CT (US); Robert C. Tedesco, Huntington, CT (US)

(73) Assignee: Walker Digital, LLC, Stamford, CT (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/459,063

(22) Filed: Jul. 21, 2006

(65) Prior Publication Data

US 2006/0289632 A1    Dec. 28, 2006

Related U.S. Application Data

(63) Continuation of application No. 10/849,622, filed on May 19, 2004, now Pat. No. 7,090,123, which is a continuation-in-part of application No. 10/146,302, filed on Oct. 26, 2001, now Pat. No. 6,739,505, which is a continuation-in-part of application No. 09/223,164, filed on Dec. 30, 1998, now Pat. No. 6,325,284.

(51) Int. Cl.
*G06K 5/00* (2006.01)

(52) U.S. Cl. ...................................... 235/380; 235/487
(58) Field of Classification Search ................. 235/380, 235/375, 382, 383, 379, 486, 487, 492; 705/41, 705/44, 67
See application file for complete search history.

(56) References Cited

U.S. PATENT DOCUMENTS

| 4,443,027 | A | * | 4/1984 | McNeely et al. | 283/83 |
| 4,614,144 | A | * | 9/1986 | Sagara et al. | 84/609 |
| 4,648,189 | A | * | 3/1987 | Michel | 40/546 |
| 4,667,088 | A |   | 5/1987 | Kramer et al. | |
| 4,667,657 | A | * | 5/1987 | Kulik et al. | 600/215 |
| 4,677,657 | A |   | 6/1987 | Nagata et al. | |
| 4,692,745 | A | * | 9/1987 | Simanowitz | 340/568.7 |

(Continued)

FOREIGN PATENT DOCUMENTS

EP    0 785 527 A2    7/1997

(Continued)

OTHER PUBLICATIONS

Ohta, Satoshi et al., "Packaging Technology for Smart IC Cards with a Display Element", OKI Technical Review 138, Jun. 1991, 3 pp.

(Continued)

*Primary Examiner*—Daniel St.Cyr
(74) *Attorney, Agent, or Firm*—Fincham Downs LLC

(57) ABSTRACT

One embodiment of the present invention provides for detecting a physical change at a transaction card, and, in response to detecting the physical change outputting content to attract the attention of a user.

39 Claims, 15 Drawing Sheets

U.S. PATENT DOCUMENTS

| | | | | |
|---|---|---|---|---|
| 4,804,825 A | * | 2/1989 | Bitoh | 235/380 |
| 4,851,654 A | * | 7/1989 | Nitta | 235/492 |
| 4,916,296 A | * | 4/1990 | Streck | 235/454 |
| 5,056,145 A | * | 10/1991 | Yamamoto et al. | 704/270 |
| 5,120,939 A | * | 6/1992 | Claus et al. | 235/382 |
| 5,140,517 A | * | 8/1992 | Nagata et al. | 705/41 |
| 5,192,947 A | * | 3/1993 | Neustein | 340/7.63 |
| 5,204,657 A | * | 4/1993 | Prosser et al. | 340/571 |
| 5,234,729 A | * | 8/1993 | Wheatley et al. | 428/30 |
| 5,359,183 A | | 10/1994 | Skodlar | |
| 5,412,192 A | | 5/1995 | Hoss | |
| 5,418,520 A | | 5/1995 | Hirshberg | |
| 5,515,031 A | | 5/1996 | Pereira et al. | |
| 5,548,271 A | | 8/1996 | Tsuchiyama et al. | |
| 5,585,787 A | | 12/1996 | Wallerstein | |
| 5,642,095 A | | 6/1997 | Cook | |
| 5,675,627 A | | 10/1997 | Yaker | |
| 5,679,939 A | | 10/1997 | Watanabe | |
| 5,746,451 A | | 5/1998 | Weyer | |
| 5,857,079 A | | 1/1999 | Claus et al. | |
| 5,955,961 A | | 9/1999 | Wallerstein | |
| 6,279,824 B1 | | 8/2001 | Park | |
| 6,325,284 B1 | | 12/2001 | Walker et al. | |
| 6,739,505 B2 | * | 5/2004 | Walker et al. | 235/380 |
| 7,090,123 B2 | * | 8/2006 | Walker et al. | 235/380 |

FOREIGN PATENT DOCUMENTS

| | | |
|---|---|---|
| EP | 0 785 527 A3 | 7/1997 |
| FR | 2 629 613 A1 | 10/1989 |
| WO | WO 98/24071 | 6/1998 |

OTHER PUBLICATIONS

Fickenscher, Lisa, "Chase Lens Card Magnifies Its Bid to Be Picked for Use", American Banker, Aug. 13, 1998, 1 pg.

Abstract, "These Batteries are ultra-thin", Oak Ridge National Laboratory, Sep. 2000, vol. 38, No. 10, 1 pg.

Notice of Allowance for U.S. Appl. No. 10/849,622 mailed Mar. 2, 2006, 6 pp.

Office Action for U.S. Appl. No. 10/849,622 mailed Mar. 2, 2006, 6 pp.

Notice of Allowance for U.S. Appl. No. 10/146,302 mailed Apr. 2, 2004, 6 pp.

Office Action for U.S. Appl. No. 10/146,302 mailed Aug. 18, 2003, 8 pp.

Written Opinion for PCT/US05/17200 mailed Nov. 10, 2005, 4 pp.

International Search Report for PCT/US05/17200 mailed Nov. 10, 2005, 3 pp.

Notification of Transmittal of the International Search Report for PCT/US99/29658 mailed Dec. 13, 2000, 7 pp.

Notification of Transmittal of the International Preliminary Examination Report for PCT/US99/29658 mailed Jan. 31, 2001, 4 pp.

Notice of Allowability for U.S. Appl. No. 09/223,164 mailed Jun. 18, 2001, 1 pg.

Notice of Allowability for U.S. Appl. No. 09/223,164 mailed Jan. 25, 2001, 4 pp.

Office Action for U.S. Appl. No. 09/223,164 mailed Jun. 21, 2000, 6 pp.

* cited by examiner

US 7,806,320 B2

METHOD AND APPARATUS FOR PROMOTING THE SELECTION AND USE OF A TRANSACTION CARD

CROSS-REFERENCE TO RELATED APPLICATIONS

The present application is a continuation of U.S. patent application Ser. No. 10/849,622, filed May 19, 2004 and issued on Aug. 15, 2006 as U.S. Pat. No. 7,090,123, entitled "METHOD AND APPARATUS FOR PROMOTING THE SELECTION AND USE OF A TRANSACTION CARD"; which is a continuation-in-part of U.S. patent application No. 10/146,302, filed Oct. 26, 2001 and issued on May 25, 2004, as U.S. Pat. No. 6,739,505; which is a continuation-in-part of U.S. patent application No. 09/223,164, filed Dec. 30, 1998 and issued on Dec. 4, 2001 as U.S. Pat. No. 6,325,284.

Each of the above-referenced applications is incorporated by reference herein in its entirety.

FIELD OF INVENTION

The present invention relates generally to a device and method for promoting the selection and use of a transaction card.

BACKGROUND OF THE INVENTION

Each year, more and more credit cards are offered by credit card issuers to consumers. These credit cards are commonly offered to consumers through the mail and at points of purchase. In both cases, credit card issuers include some type of enticement as part of their marketing effort to distinguish their credit card offer from their competitors' so as to attract the attention of consumers. An ideal method of enticement encourages consumers to open an account with the credit card issuer and, once an account has been opened, motivates the consumer to use the new credit card. In this way, continuous revenue for the credit card issuer may be generated.

One method that is used to encourage consumers to establish an account and to use a particular credit card is an incentive program that offers awards to consumers. For example, such well-known programs provide frequent-flyer mile earnings or cash-back bonuses based on the amount charged on a credit card. Another program provides discounts to consumers for purchasing products or services at participating merchants' businesses. Yet another program offers co-branded cards in which a credit card issuer affiliates itself with another company or organization in order to offer a consumer certain purchasing advantages. The purchasing advantages may include discounts on purchases of products and/or services from the co-branded company or financial support for a particular organization that the consumer chooses to be associated with, such as a college alumnus organization.

A disadvantage of program-based incentives such as those described above is that a large number of consumers typically do not take the time to read the rules and options of the programs. Nor do they take the time to calculate the possible cost savings. To the contrary, these consumers tend to establish accounts with credit card issuers by impulse rather than based on a careful evaluation of merits of the offered programs. In particular, they are more likely to accept an offer to open an account with a credit card issuer at times that happen to be convenient for them and/or that in some way attract their attention over other similar products or services made available to them.

In an attempt to attract those consumers that are responsive to marketing methods that provide immediate convenience and/or that attract their attention over other similar products, credit card issuers have added unique physical features to their credit cards. For example, credit card issuers have offered credit cards to consumers which have their pictures imprinted on the face of the credit card. The pictures function as a form of identification for the consumer and are also used for security purposes.

In addition, credit card issuers have offered credit cards that include illustrations depicting various themes that appeal to consumers' interests. Further, credit cards have been offered which incorporate a utilitarian feature, such as a magnifier, that can be used by a consumer.

A disadvantage of the above-described attempts to attract consumers by offering them credit cards having unique physical features is that the features do not sufficiently differentiate the credit cards from other credit cards. More specifically, these previous attempts have primarily added only passive attributes to credit cards and, therefore, such attempts do not readily gain the attention of consumers.

In addition to the above disadvantages, credit card issuers are confronted with the problem that most consumers already have a number of credit cards to select from when they are deciding to make a purchase. As described above, consumers typically do not read the rules and options of a program, nor do they take the time to calculate the possible savings the various programs offer. Therefore, it is infrequent that a consumer will choose a credit card because of a particular incentive program. Indeed, it is more likely that a consumer will be attracted to a credit card because of its unique physical features, than because of an incentive program associated with it.

BRIEF DESCRIPTION OF THE DRAWINGS

So that those of ordinary skill in the art to which the subject invention pertains will more readily understand how to make and use the device and method described herein, preferred embodiments of the invention will be described in detail with reference to the drawings, wherein.

Figure 1:
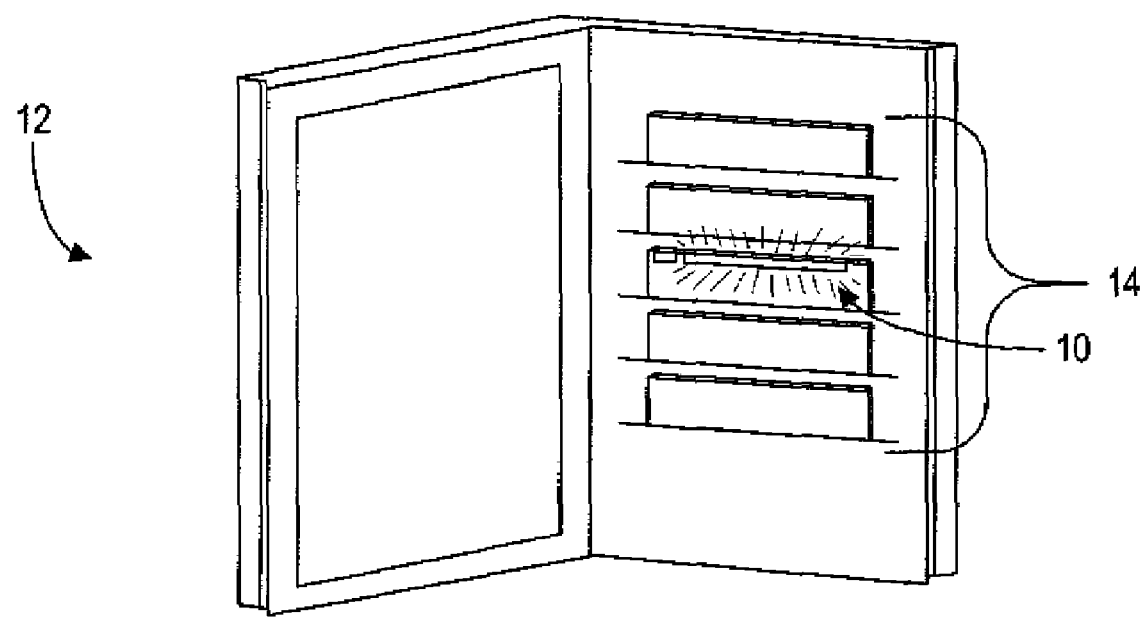
FIG. 1 is a perspective view of a wallet having a credit card therein which includes an embodiment of the present invention.

These and other features of the device and method disclosed herein will become more readily apparent from the following detailed description of the embodiments taken in conjunction with the drawings.

DETAILED DESCRIPTION OF THE PREFERRED EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing instructions that may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable-media may be involved in carrying a sequence of instructions to a processor.

One embodiment of the present invention provides for receiving a merchant signal. The merchant signal may identify a merchant, may be used to identify a merchant, may include content from or corresponding to a merchant, and/or may be transmitted by or on behalf of a merchant. Content may be determined and/or output based on the merchant signal (e.g., after sensing a physical change).

One embodiment of the present invention provides for sensing a physical change at a transaction card, such as a credit card, and providing content, such as information or entertainment information, in response to sensing the physical change.

The present invention provides a novel and unique device and method for promoting the selection and use of a transaction card. The device and method adds a feature to the transaction card that is intended to attract the attention of consumers and motivate them to select and use the transaction card. The feature is particularly useful in distinguishing the transaction card from other transaction cards in close proximity therewith, such as when the transaction card is in a wallet of a consumer.

The device for promoting the selection and use of a transaction card includes a sensor that is adapted and configured to sense a physical change. The sensor is in communication with a driver circuit. The driver circuit produces at least one driver signal when the sensor detects a physical change. A transducer is in communication with the driver circuit and is adapted and configured to emit at least one perceptible output signal in response to receiving the at least one driver signal. A resetting circuit is adapted and configured to reset the driver circuit.

According to an alternative embodiment, the device for promoting the selection and use of a transaction card includes a sensor that is adapted and configured to sense a predefined physical change. The sensor is in communication with a driver circuit. The driver circuit produces at least one driver signal for a predetermined amount of time when the sensor detects a predefined physical change. A transducer is in communication with the driver circuit and is adapted and configured to emit at least one perceptible output signal in response to receiving the at least one driver signal. A resetting circuit is adapted and configured to reset the driver circuit after the predefined physical change is removed.

The components and interconnections therefor are incorporated into a transaction card. The sensor and transducer are, for example, located proximate the top edge of the transaction card. This location permits the sensor to properly detect the physical change and permits a consumer to readily observe the output signal produced by the transducer when the transaction card is stored in a pocket of a wallet. Components (e.g., solar cell, pressure sensor, microphone, thermometer, barometer, voltmeter, compass) for sensing various types of physical changes are well known. A Global Positioning System (GPS) device, such as Philips Semiconductor's SAF 1576 GPS baseband receiver, may also be used as a sensor. The driver circuit can be a processor or logic circuit.

A processor can be used to determine which content to output. For example, the processor can be used to generate a random number that is then used to randomly select at least one driver signal from a plurality of driver signals stored in a memory. Alternatively, or in addition, a receiver of the transaction card receives the driver signals and/or content. The received driver signals may be stored in the memory or "streamed" from the receiver to the processor to produce "streaming" output. Alternatively, or in addition, the user may establish preferences for particular types of content. In that case, the driver signals may be selected based on the user preferences. According to another embodiment, the driver signal (or signals) corresponding to the most recent content may be selected. According to another embodiment, the content may be determined according to a schedule or order. According to another embodiment, the content may be determined based on the type of physical change detected.

As discussed herein, content may be stored in a memory of the transaction card. One or more conditions for outputting particular content may be associated with that content, e.g., in a database. For example, a database may contain records corresponding respectively to different content. The records may include various fields, such as a field containing an identifier that uniquely identifies the content, a content field that includes an indication of the content (e.g., an audio file, a text message), and a condition field that specifies under what condition(s) to output the content. Optionally, the content may be associated with one or more output means (e.g., speaker, LED). In one embodiment, content may be associated with a rating or priority, such that higher priority content is output before other content (e.g., marketing information, if available, is output before horoscope information).

In one example, a record in a content database includes an indication of a message identified as "M-002," and the associated message is "Double Delta Miles when buying products at Staples !" The message is to be output when a wireless signal is received by the transaction card from a participating merchant identified as "PM-001" and after a physical change is detected (e.g., a change in ambient light). In another example, a message identified as "M-003" is a market summary of the NASDAQ ™. The message is to be output when a physical change is sensed between 3:30 and 5:30 p.m.

According to some embodiments, the output of one or more messages (or other content) may be triggered by certain conditions or rules. For example, a particular text message may be output based on the time of day, or when the transaction card is within range of a transmitting source (e.g., a participating merchant). For instance, a text message may be triggered for output if the user enters "Office Supply Depot" (e.g., recognized by GPS and/or receipt of a signal transmitted by or on behalf of that merchant). When the card senses a physical change (e.g., the user opens his wallet), the text message is output. In this way, output of content may be configured based on the location of the transaction card and/or based on preferences of a merchant.

In some embodiments, the transaction card may be configured to provide certain content by default. For example, a scrolling stock market summary may be the default output, unless higher priority or more relevant content is available or triggered for output. For instance, if a user enters a store and the card detects a physical change, sales information for that store may be output instead of the default stock market summary. In another example, if the transaction card receives a new set of digital images, one or more of those images may be presented instead of the default output.

Each driver signal may represent information and/or entertainment content, such as, without limitation, text messages, audio messages, tones, phrases, display patterns, images, video, lottery numbers, jokes, quotations, sports information (e.g., sports scores), market information (e.g., stock prices, mutual fund prices, bond prices, index data), information about goods or services for sale (e.g., price information, description, coupons), horoscopes, sounds, travel information, weather information, exchange rates, or songs.

The transducer can be a display. There are many displays well known in the art, including a liquid-crystal display ("LCD") or a flexible display, such as the flexible plastic displays compatible with smart cards manufactured by Alien Technology™. The plurality of driver signals may thus represent, for example, messages, lottery numbers, or other content, as described above. The type of display need not be limited to an LCD or flexible display. The transducer can also be a speaker and the plurality of driver signals may represent, for example, different tones, phrases, or other content, as described above. In such case, the speaker may be a piezoelectric vibrator. Further, the transducer can be a light-emitting diode ("LED") and the plurality of driver signals may represent different signal patterns corresponding to the content described above. For example, the driver circuit may transmit driver signals to the LED that produce intermittent pulses of light or light pulses produced according to a predetermined pattern. Alternatively, the pattern of pulses of light need not be predetermined. The light emitted from the LED can be transmitted through the body of the transaction card by a fiber optic channel.

The device also includes a power source for energizing the device throughout the useful life of the transaction card. The power source may be, for example, a solar cell, an inductive power system, a radioactive cell, or a thin film lithium battery. The solar cell can be used as both a sensor and a power source. Output of the power source can be controlled, for example, by (i) a controller, (ii) the driver circuit, (iii) a separate dedicated processor, or (iv) a separate dedicated logic circuit.

An embodiment of the present invention also includes a switch that is adapted and configured to change the output of the transducer from a first driver signal to a second driver signal. Another embodiment of the present invention includes two transducers in communication with the driver circuit and further includes a switch which is adapted and configured to redirect the at least one driver signal from one of the two transducers to the other.

The device can further include a clock that is adapted and configured to cooperate with the driver circuit to determine time. Different driver signals can then be sent to the transducer based on the time as calculated by the driver circuit.

The device can further include a receiver for receiving content or data from a content provider or transmitting source, preferably via wireless data communication. For example, the receiver could be part of a radio system enabled for two-way wireless data communications. There are many well-known types of radio receivers, including high-power and low-power radio receivers, such as RF Monolitics, Inc.'s low-power radio system for two-way wireless data communications. Other types of receivers include GPS receivers like Philips Semiconductor's SAF1576 single-chip GPS (Global Positioning System) baseband receiver with embedded system RAM and ROM, as well as receivers for wireless telephony, handheld devices, and personal digital assistants. Data, messages, and information can thus be received from a content provider or transmitting source, such as a personal digital assistant, cellular telephone, radio source or cellular communications source. Alternatively, the device may receive data from the user via a keypad on the device. For example, the user may input name and address information for a contact list, items for a task list, or data corresponding to a schedule of items or calendar.

The device can further include means for receiving and storing data via a card reader, for example. In this manner, a joke message may be transmitted by the card reader device of a point-of-sale terminal to the card, which stores the joke message. The holder of the transaction card may then hear or view the joke as a result of the card detecting a physical change as described above.

The device can further include a transmitter for requesting content from a content provider, preferably via wireless communication. For example, the transmitter could be part of a radio system or infrared system enabled for two-way wireless data communications. Embodiments of the present invention provide for the device to transmit a request for content. The request may be transmitted, for example, according to a schedule, whenever a physical change is detected, upon request by the user, or any combination thereof.

Reference is now made to the accompanying Figures for the purpose of describing, in detail, the preferred embodiments of the present invention. The Figures accompanying the detailed description are provided as examples of the invention and are not intended to limit the scope of the claims appended hereto.

Conventional credit cards are a well-known form of identification used by individuals to have merchandise, services, etc., billed to a charge account. The term "transaction card" is intended herein to include any type of card, typically carried by a consumer, which is physically similar to a conventional credit card. Examples of such cards include, without limitation, credit cards, debit cards, smart cards, Internet access card, prepaid calling card, electronic cash card, health insurance, association membership, and airline mileage cards. Although the term is to be understood to include all such cards, the detailed description below relates to conventional credit cards so as to provide a more simplified explanation of the invention. Those skilled in the art will understand that a smart card may include components that may perform some or all of the functionality of the present invention.

A transaction card may be used to initiate, complete, authorize, or otherwise enable a financial transaction, such as a purchase or a withdrawal from a financial account. A transaction card may also be used to verify a cardholder's identity and/or to authorize a transaction, such as a purchase.

Those skilled in the art will readily recognize that products exhibiting at least one of the following physical features often attract the attention of consumers: (i) a feature that moves or simulates movement; (ii) a feature that includes light elements, especially lights that periodically pulse; (iii) a feature incorporating bright colors; (iv) a feature that produces a sound; (v) a feature that provides useful and/or entertaining information; (vi) a feature that changes; and (vii) a feature that arouses the consumer's sense of curiosity or raises their anticipation.

The present invention provides a device and method for a transaction card with a novel physical feature (such as those described above) to attract a consumer's attention and encourage him to open an account (or otherwise establish a relationship) with a transaction card issuer. In addition, the present invention entices a consumer to use the transaction card preferentially over other transaction cards available to him for his intended purpose (e.g., for a purchase at a point of purchase).

In addition, the entertainment and/or informational features of the present invention motivate a holder of a transaction card to keep the card in view or otherwise in a location or position where the features may be enjoyed by the holder and/or others. For example, a holder of a credit card that is consistent with the present invention and operative to receive and display sports information when in the presence of ambient light might be motivated to keep the credit card in view on his desk in order to view a scrolling display of sports scores. In another example, a holder of a credit card that is consistent with the present invention and operative to receive and provide audio information when a pressure sensor detects pressure on the card might be motivated to hold the card in his hand while shopping in a mall in order to receive an audio message about current sales promotions of stores in the mall.

Referring now to FIG. 1, an open wallet 12 is shown to illustrate an embodiment of the disclosed invention. As is typical of many consumers' wallets, a number of credit cards 14 are positioned in close proximity to one another in pockets of wallet 12.

A moment of great interest to transaction card issuers is when a consumer has his wallet open and is about to select a transaction card (e.g., removing a credit card to make a purchase). The present invention takes advantage of the situation by providing a device and method that distinguishes a transaction card from other physically similar transaction cards that are in close proximity thereto. In this way, upon opening wallet 12, a consumer's eye is immediately drawn toward a particular credit card 10, thereby encouraging its selection and use.

Figure 2:
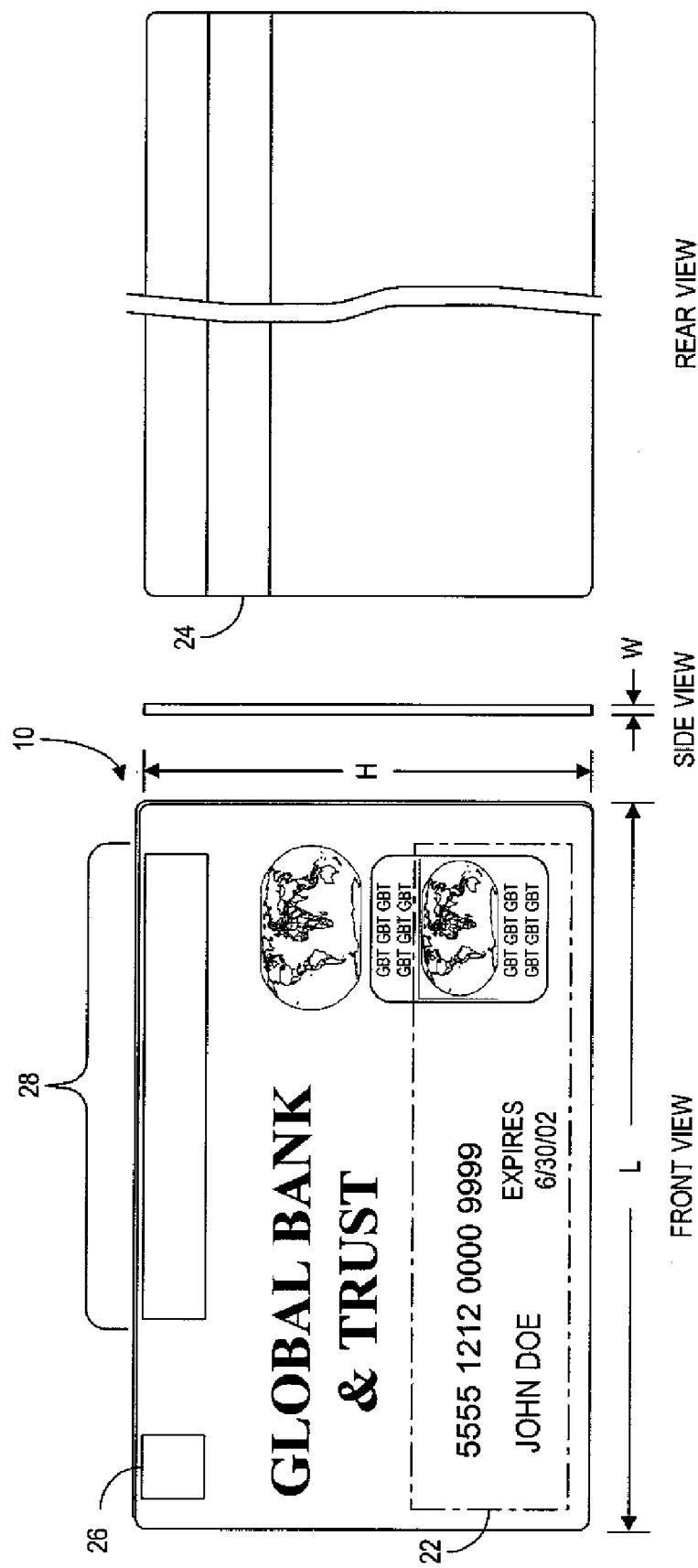
FIG. 2 is a front, side, and rear elevation view of the credit card shown in FIG. 1.

Referring now to FIG. 2, credit card 10 is shown, which conforms to the "Standards for Credit Card Specifications,"ISO 7810, of the International Organization for Standardization. As is well known, credit card 10 has a length ("L"), height ("H"), and width ("W") of approximately 3.375, 2.127, and 0.030 inch, respectively.

Referring to the Front View of FIG. 2, an embossing area 22 is located on the lower portion of credit card 10 and has the approximate dimensions of one (1) inch by three (3) inches. The embossing area 22 is reserved for credit card issuers to emboss a consumer's name and credit card account information. The Rear View shows a magnetic strip 24 adhered to the upper portion of credit card 10 for encoding a consumer's account information in machine-readable form.

Referring again to the Front View of FIG. 2, a sensor 26 is molded into the upper left-hand portion of credit card 10. A transducer 28 is molded into the upper portion of credit card 10. It is convenient to position sensor 26 and transducer 28 at or near the upper edge of credit card 10 so that they are not blocked by other credit cards when the credit card is stored in wallet 12 and not thwarted from functioning as intended. Of course, the location of sensor 26 and transducer 28 are not considered critical to the present invention so long as they are capable of performing their intended respective functions as described.

As will be more fully described below, sensor 26 is configured to cooperate with transducer 28 such that when sensor 26 detects a physical change, it activates transducer 28 to emit a perceptible output signal. The physical change can be one of a number of physical changes known in nature, including, for example, a measure of or change in light intensity, pressure, sound, humidity, contact with water, altitude, air pressure, air current, electrical current, location, orientation, or temperature. The physical change may be, but does not have to be, predefined. Sensor 26 can be any of a number of appropriate elements for sensing a physical change, for example, a solar cell, pressure sensor, barometer, altimeter, GPS receiver, thermometer, compass, or microphone. Transducer 28 can be any of a number of elements for emitting perceptible output signals, for example, a light emitting diode ("LED"), liquid crystal display ("LCD"), or a speaker.

As an example of the above-described credit card in use, consider that a consumer opens wallet 12 (FIG. 1) to select a credit card from his collection of credit cards 14 stored therein. Further, assume that sensor 26 is a solar cell and transducer 28 is an LED. When wallet 12 is opened, the solar cell detects a change in ambient light and activates the LED to pulse in a predetermined pattern. Alternatively, the pattern is not predetermined. Because of this distinguishing feature, the consumer immediately recognizes credit card 10 and is motivated to consider whether to use it for charging a purchase.

Figure 3:
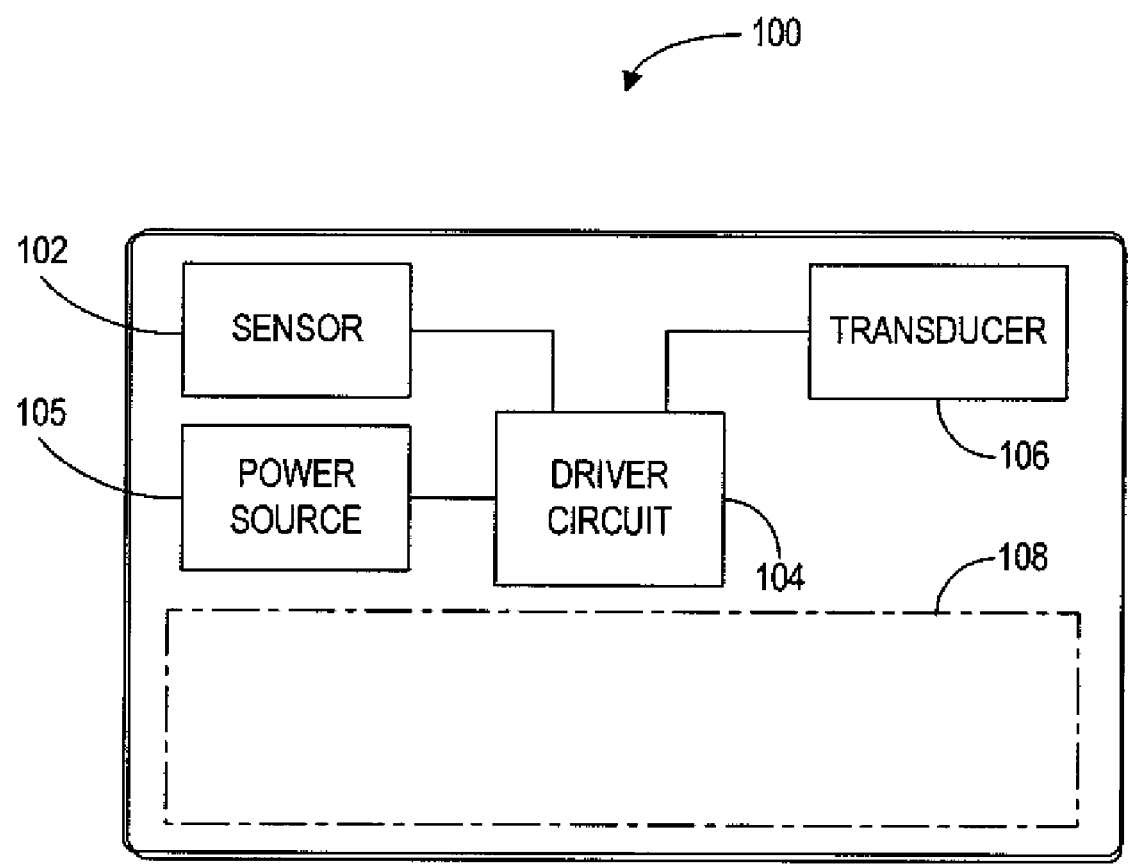
FIG. 3 is a front elevation view in schematic form of a credit card that includes an embodiment of the present invention, wherein basic components are shown.

Referring now to FIG. 3, there is illustrated in schematic form a credit card 100 representative of credit card 10 that includes a device embodying the present invention. A sensor 102 is positioned in the upper left-hand portion of credit card 100. A driver circuit 104, for example, a processor or a logic circuit, is positioned in the upper middle portion of credit card 100 and is in communication with sensor 102. The driver circuit 104 is powered by a power source 105. Electrical energy supplied by the power source 105 is controlled by, for example, the driver circuit, a dedicated processor or dedicated logic circuit. A transducer 106 is positioned in the upper right-hand portion of credit card 100 and is in communication with driver circuit 104. Sensor 102, driver circuit 104, power source 105, and transducer 106 are all located outside of an embossing area 108.

Figure 4:
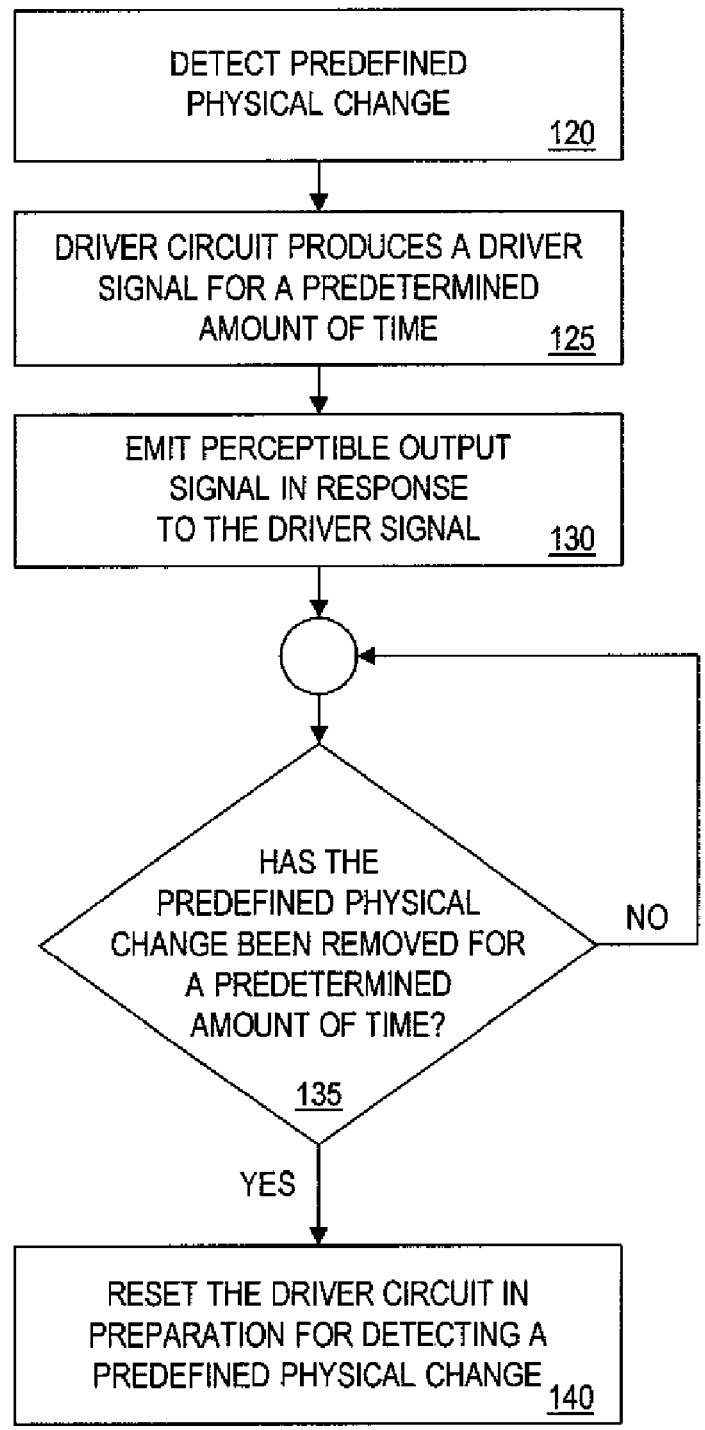
FIG. 4 is a flow chart illustrating the operation of the credit card shown in FIG. 3.

FIG. 4 is a flow chart illustrating the operation of credit card 100 shown in FIG. 3. At step 120, sensor 102 detects a predefined physical condition and produces a signal. Alternatively, the physical change need not be predefined. At step 125, driver circuit 104 receives the signal from sensor 102 and responds by producing a driver signal for a predetermined amount of time. Alternatively, the amount of time the driver signal is produced is not predetermined. At step 130, the driver signal produced at step 125 is transmitted to transducer 106 and a perceptible output signal is emitted in response to the driver signal. Driver circuit 104 then reverts to standby mode (e.g., after a predetermined amount of time, after another sensed physical change), whereby it discontinues producing the driver signal. Consequentially, transducer 106 discontinues emitting the perceptible output signal.

Step 135 includes determining whether the physical change has been removed from sensor 102 for a predetermined amount of time. For example, if the sensor 102 is a solar cell, then step 135 may include determining whether a predetermined amount of time has passed after a consumer has closed his wallet and light is discontinued from shining on the solar cell. As another example, if the sensor 102 is a pressure sensor, then step 135 may include determining whether a predetermined amount of time has passed after a consumer has closed his wallet and pressure is reapplied to the pressure sensor. Alternatively, the amount of time the physical change has been removed from sensor 102 need not be predetermined.

If the physical change has not been removed for a predetermined amount of time, then driver circuit 104 remains in standby mode. Step 135 is repeated periodically until the condition is satisfied, at which time driver circuit 104 carries out step 140. At step 140, driver circuit 104 is reset from standby mode to ready mode and, as a result, is ready for detecting a physical change as described above in step 120. Steps 135 and 140 are executed, for example, when a consumer closes wallet 12 (FIG. 1) after having returned credit card 100 to a pocket of wallet 12 upon completion of a purchase.

Figure 5:
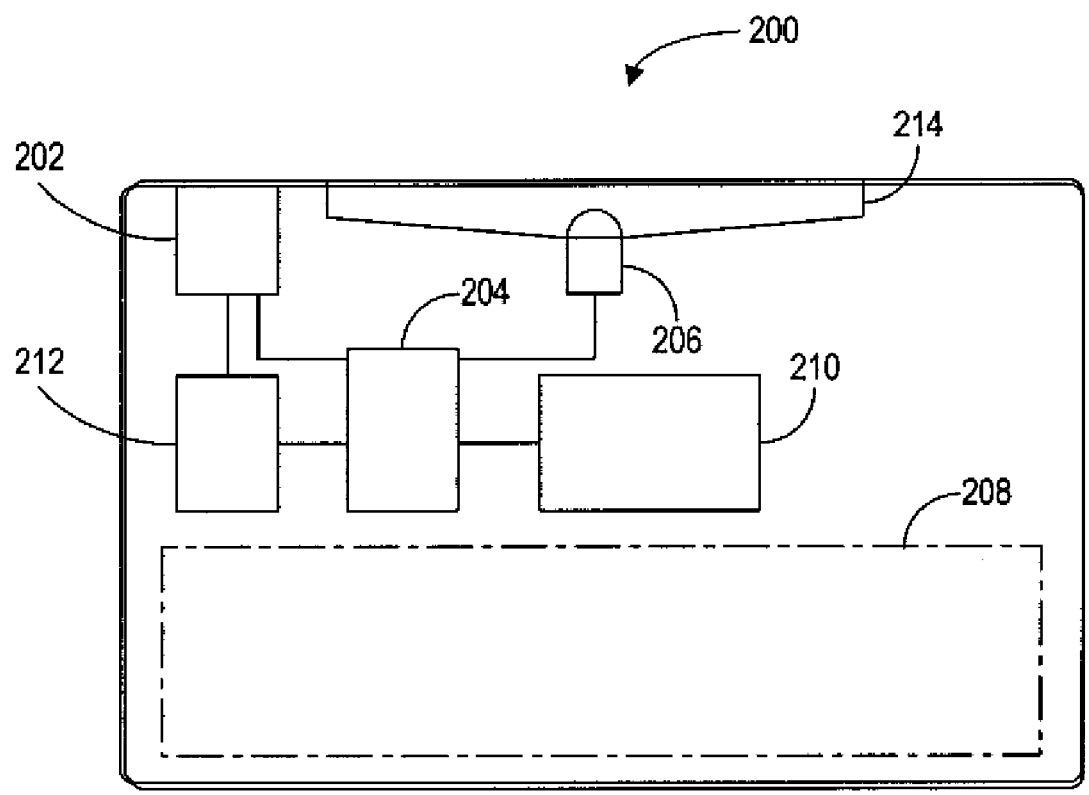
FIG. 5 is a front elevation view in schematic form of a credit card that includes an embodiment of the present invention, wherein a solar cell senses light and light is emitted from a light emitting diode.

Referring now to FIG. 5 there is illustrated in schematic form a credit card 200 illustrative of another embodiment of the present invention. A solar cell 202, or another appropriate sensor, is positioned in the upper left-hand portion of credit card 200. The solar cell 202 senses the presence of (or changes in) ambient light, at which time it produces a signal. A processor 204, or another appropriate processor, is positioned in the upper middle portion of credit card 200 and is in communication with solar cell 202. A battery 212, or another appropriate power source, provides power to processor 204. Memory 210 is in communication with processor 204, thereby enabling processor 204 to retrieve instructions and store data.

Battery 212 can be one of a number of battery types, for example, a solar cell, inductive power system, radioactive cell, or thin film lithium battery. Memory 210 can include, for example, (i) random access memory (RAM), (ii) read only memory (ROM), or (iii) a combination thereof.

An LED 206, or another appropriate transducer, is positioned in the upper right-hand portion of credit card 200 and is in communication with processor 204. A fiber optic channel 214 provides an optical path between LED 206 and the upper edge of credit card 200. Each of the above elements is located outside of an embossing area 208.

Figure 6:
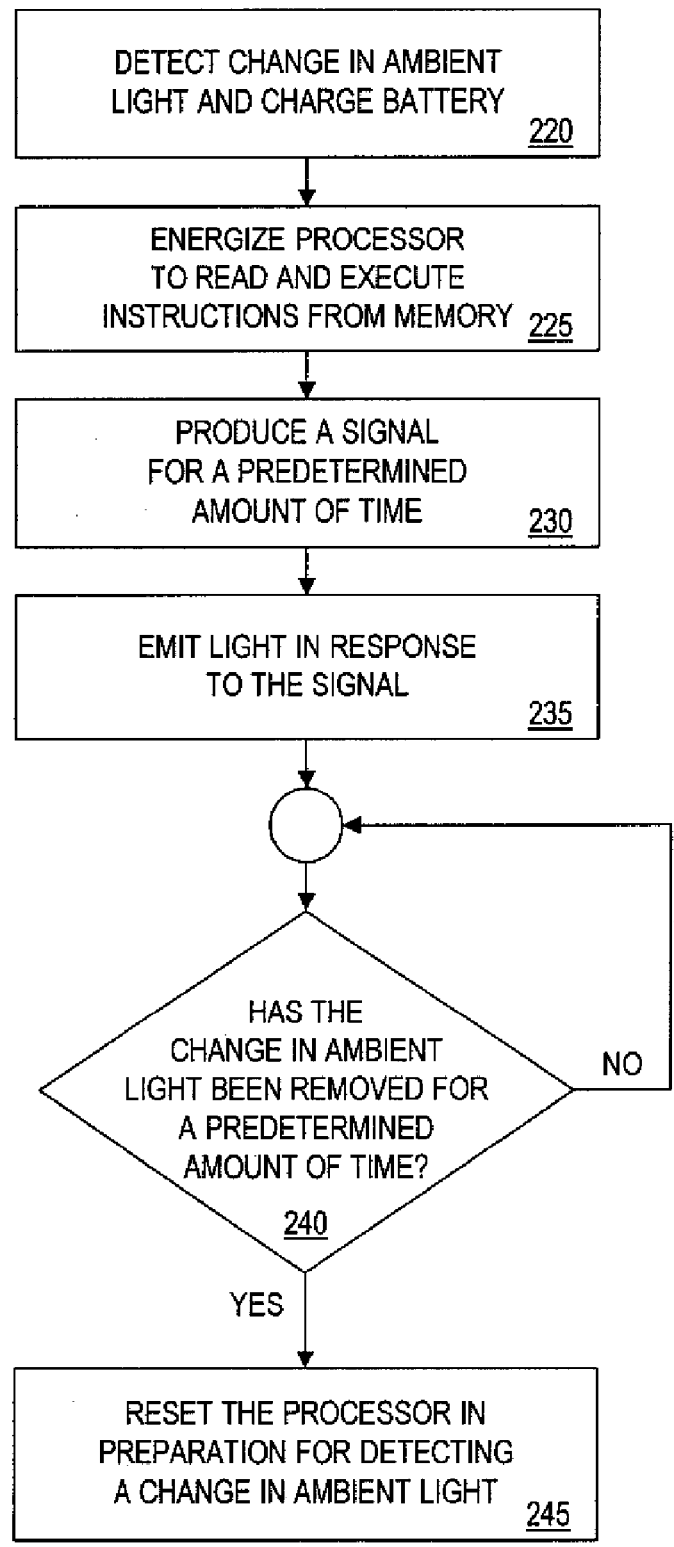
FIG. 6 is a flow chart illustrating the operation of the credit card shown in FIG. 5.

FIG. 6 is a flow chart illustrating the operation of the credit card 200 shown in FIG. 5. At step 220, solar cell 202 detects the presence of (or a change in) ambient light and starts to charge battery 212. At step 225, the battery 212 is sufficiently charged to energize processor 204, which in turn reads and executes instructions from memory 210.

At step 230, the instructions cause processor 204 to output a signal for a predetermined amount of time. Alternatively, the amount of time the processor is output by processor 204 is not predetermined. At step 235, LED 206 emits light in response to the signal. Depending on the instructions stored in memory, the output emitted from LED 206 can be a steady stream of light, short periodic pulses of light, or a pattern of light pulses. Processor 204 then reverts to a standby mode and it discontinues producing the signal. Consequentially, LED 206 discontinues emitting light.

Step 240 includes processor 204 monitoring solar cell 202 to determine whether the ambient light (or change in ambient light) has been removed for a predetermined amount of time. Alternatively, the amount of time the ambient light (or change in ambient light) has been removed need not be predetermined. If the ambient light (or change in ambient light) has not been removed, then processor 204 remains in standby mode. Step 240 is periodically repeated until the ambient light (or change in ambient light) is removed, at which time processor 204 carries out step 245. At step 245, processor 204 is reset from standby mode to a ready mode and is ready for detecting ambient light (or a change in ambient light) as described above in step 220.

Figure 7:
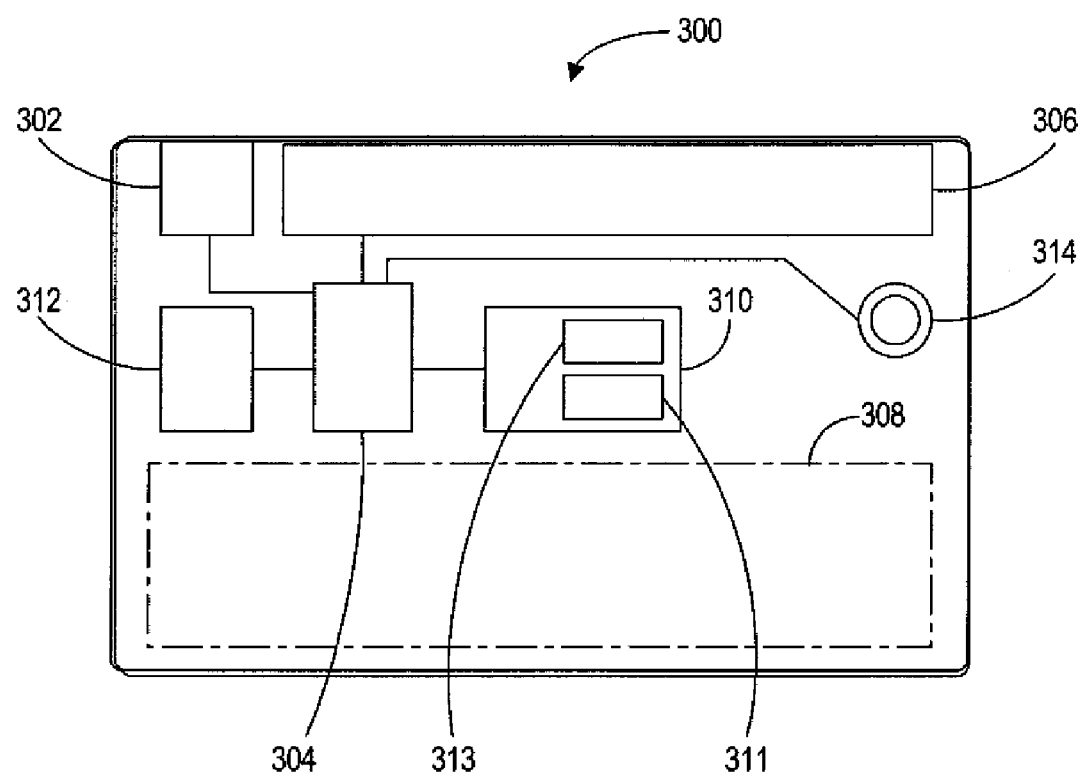
FIG. 7 is a front elevation view in schematic form of a credit card that includes an embodiment of the present invention, wherein a solar cell senses light and a switch is used to change messages displayed on a liquid crystal display.

Referring now to FIG. 7 there is illustrated in schematic form a credit card 300 which includes yet another embodiment of the present invention. In this embodiment, a solar cell 302 is positioned in the upper left-hand portion of credit card 300. The solar cell 302 is configured to sense ambient light (or changes in ambient light), at which time it produces a signal. A processor 304 is positioned in the upper middle portion of credit card 300 and is in communication with solar cell 302. A battery 312 provides power to processor 304. A memory 310 is in communication with processor 304, thereby enabling the processor 304 to retrieve instructions and store data. Memory 310 includes a first register 311 and a second register 313.

A switch 314 is in communication with processor 304 for changing a message that may be displayed on an LCD 306, as will be described below. The LCD 306 is positioned in the upper right-hand portion of credit card 300 and is in communication with processor 304. Each of the above elements is located outside of an embossing area 308.

Figure 8:
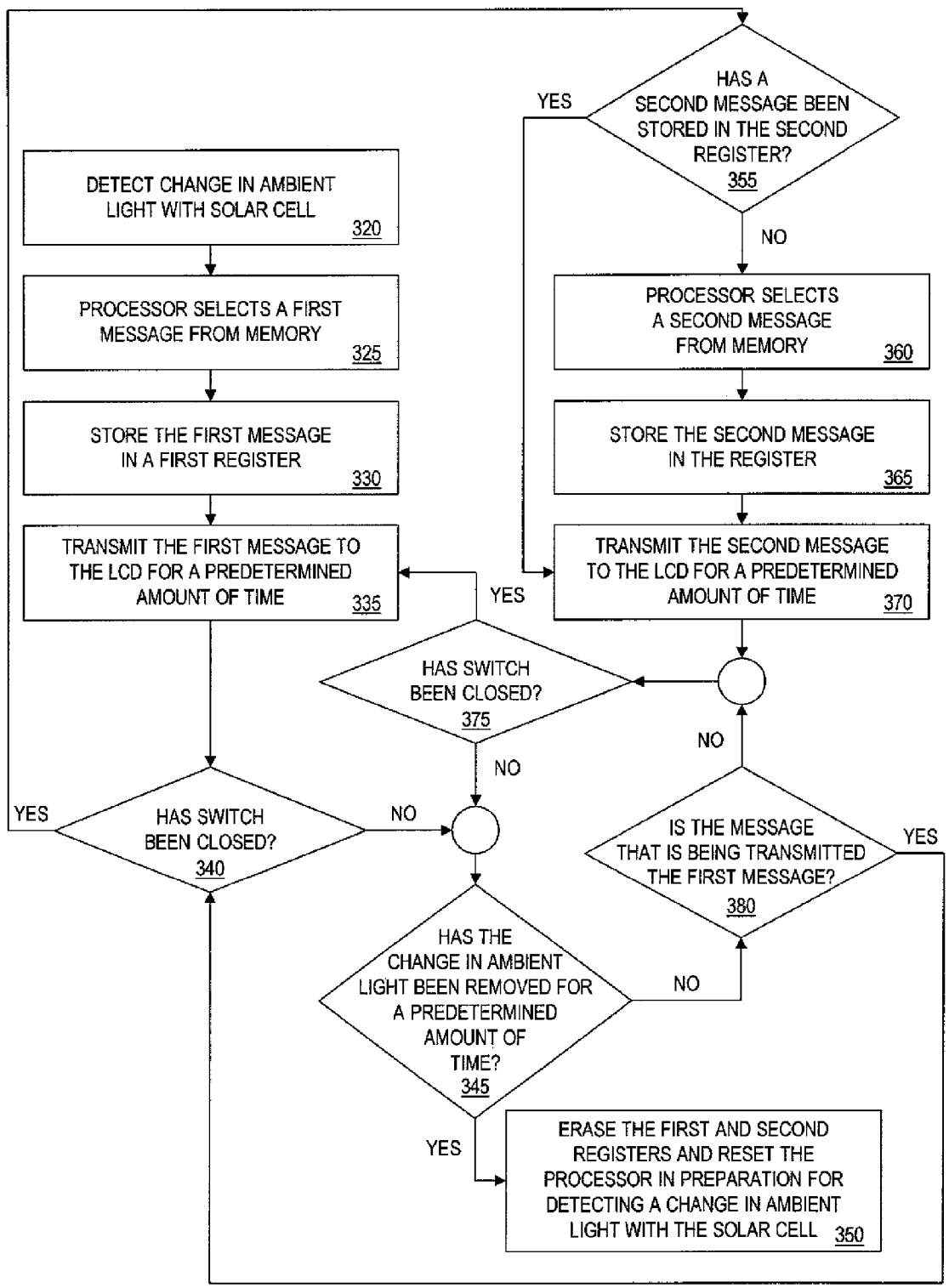
FIG. 8 is a flow chart illustrating the operation of the credit card shown in FIG. 7.

FIG. 8 is a flow chart illustrating the operation of credit card 300 shown in FIG. 7. The embodiment illustrated below is an example of a program that can be used with credit card 300. Generally, the program enables a consumer to switch between displaying a first message and a second message on LCD 306 by depressing switch 314. The messages can be, but need not be, displayed for a predetermined amount of time.

At step 320, solar cell 302 detects ambient light (or a change in ambient light) and produces a signal. At step 325, processor 304 receives the signal from solar cell 302 and responds by selecting a first message from memory 310. At step 330, the first message is stored in first register 311 of memory 310.

The message to be displayed can be selected randomly. For example, the processor can randomly select bible passages, famous quotations, or jokes that are stored in memory. Alternatively, the message to be displayed can be selected according to the time or date, For example, a real-time clock (not shown), such as an INTERSIL ICM7170, (Intersil Corp., Cupertino, Calif.) can be included to communicate with processor 304 and the messages which are selected can relate to particular dates. The messages may relate, for example, to important dates in history, holidays, paydays, or birthdays. Further, the messages can also be dynamic and/or iconic as is well known in the art. Dates may be (i) entered by a customer via an input device such as a keypad, and/or (ii) programmed into the memory when the card is manufactured.

At step 335, the first message is transmitted to and displayed on LCD 306 for a predetermined amount of time. Alternatively, the amount of time the first message is displayed on LCD 306 need not be predetermined. At step 340, processor 304 determines if switch 314 has been closed. If switch 314 has not been closed, then processor 304 advances to step 345. At step 345, processor 304 determines whether the ambient light (or the change in ambient light) has been removed for a predetermined amount of time. If so, processor 304 advances to step 350 at which the first and a second registers, 311 and 313, respectively, are erased and processor 304 is reset in preparation for detecting ambient light (or a change in ambient light) with solar cell 302. Alternatively, the amount of time the ambient light (or the change in ambient light) has been removed need not be predetermined.

If, at step 340, the switch 314 is determined to have been closed, then processor 304 advances to step 355. At step 355, processor 304 determines whether a second message has been stored in second register 313 of memory 310. If a second message has not already been stored in second register 313, then processor 304 advances to step 360. At step 360, processor 304 selects a second message from memory 310. As described above, the message can be selected randomly. At step 365, the second message is stored in second register 313. If, at step 355, processor 304 determines a second message has been stored in second register 313, then processor 304 loops around steps 360 and 365 and advances to step 370.

At step 370, the second message is transmitted to and displayed on LCD 306 for a predetermined amount of time. Alternatively, the amount of time the second message is displayed on LCD 306 need not be predetermined. At step 375, processor 304 determines whether switch 314 has been closed. If switch 314 has not been closed, then processor 304 advances to step 345. If switch 314 has been closed, then processor 304 advances to step 335.

As described above, at step 345, processor 304 determines whether the ambient light (or the change in ambient light) has been removed for a predetermined amount of time. If so, processor 304 advances to step 350. If the ambient light (or the change in ambient light) has not been removed, then processor 304 advances to step 380. Alternatively, the amount of time the ambient light (or the change in ambient light) has been removed need not be predetermined.

At step 380, processor 304 determines whether the message presently being transmitted is the first message. If the message is the first message, then processor 304 advances to step 340. If the message is not the first message, then processor 304 advances to step 375. Processing proceeds thereafter as described above until finally ending at step 350.

Figure 9:
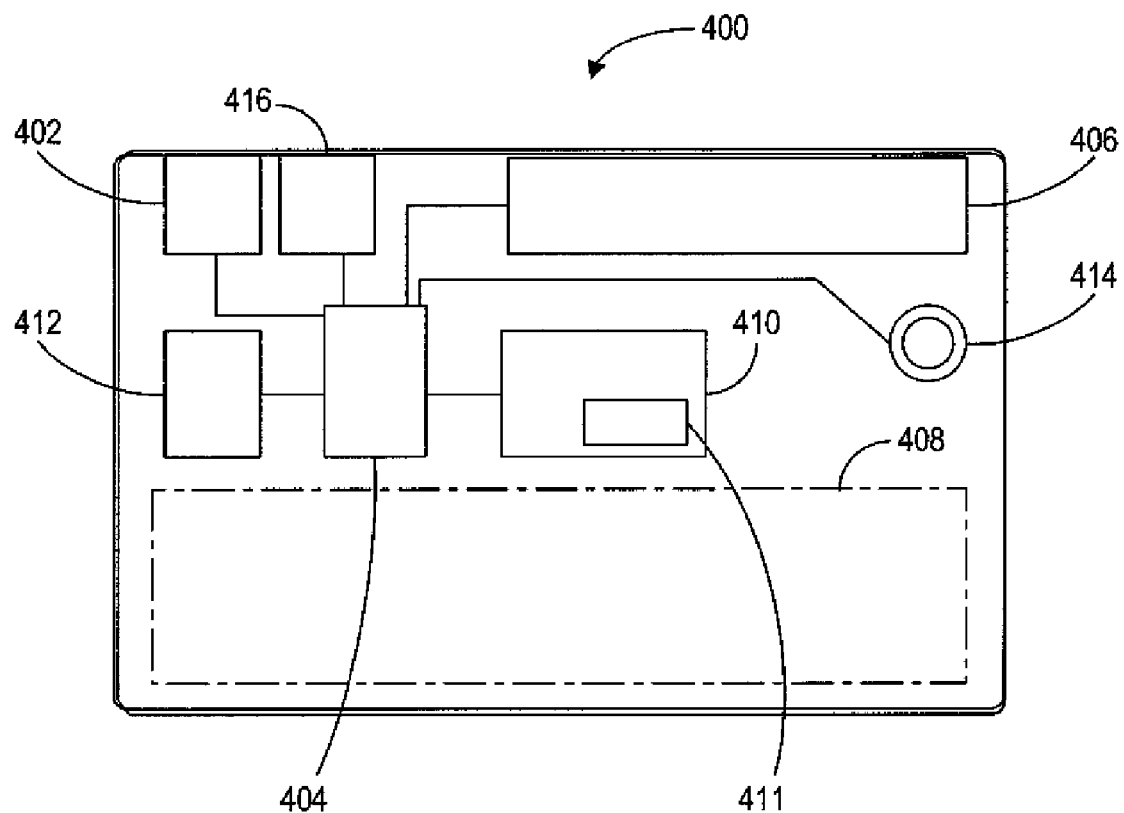
FIG. 9 is a front elevation view in schematic form of a credit card that includes an embodiment of the present invention, wherein a solar cell senses light and a switch is used to toggle between two transducers.

Referring now to FIG. 9, a credit card 400 is illustrated in schematic form to depict yet another embodiment of the present invention. In this embodiment, a solar cell 402 is positioned in the upper left-hand portion of credit card 400. The solar cell 402 is configured to sense ambient light (or changes in ambient light), at which time it produces a signal. A processor 404 is positioned in the upper middle portion of credit card 400 and is in communication with solar cell 402. A battery 412 provides power to processor 404. Memory 410 is in communication with processor 404, thereby enabling the processor 404 to retrieve instructions and store data. A switch 414 is in communication with processor 404 for switching between displaying messages on an LCD 406 and emitting a light signal on LED 416.

The LCD 406 is positioned in the upper right-hand portion of credit card 400 and is in communication with processor 404. The LED 416 is positioned in the left-hand portion of credit card 400, between the solar cell 402 and the LCD 406. Each of the above elements is located outside of an embossing area 408.

Figure 10:
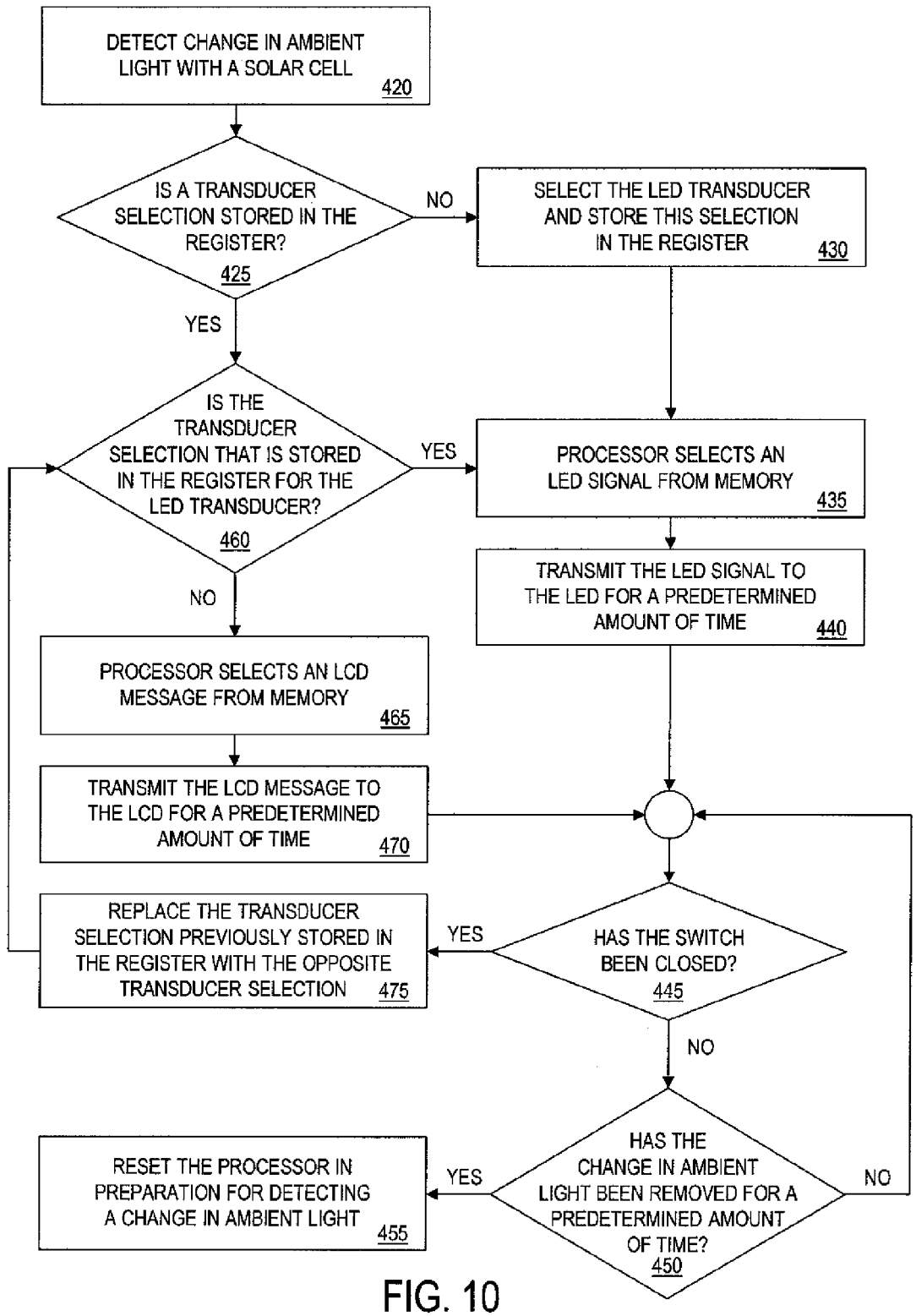
FIG. 10 is a flow chart illustrating the operation of the credit card shown in FIG. 9.

FIG. 10 is a flow chart illustrating the operation of credit card 400 shown in FIG. 9. The embodiment illustrated below is an example of a program that can be used with credit card 400. Generally, the program enables a consumer to switch between displaying a message on LCD 406 and emitting a light signal on LED 416 by depressing switch 414.

At step 420, solar cell 402 detects ambient light (or a change in ambient light) and produces a signal. At step 425, processor 404 determines whether a transducer selection is stored in a register 411 of memory 410. If a transducer selection is not stored in register 411, then processor 404 advances to step 430. At step 430, the LED 416 transducer is selected and the selection is stored in register 411.

At step 435, processor 404 selects an LED signal from memory 410. At step 440, the signal selected at step 435 is transmitted to LED 416. The signal may be transmitted for a predetermined amount of time, but the amount of time need not be predetermined. LED 416 emits light in response to the selected signal.

At step 445, processor 404 determines whether switch 414 has been closed. If switch 414 has not been closed, then processor 404 advances to step 450. In a preferred embodiment, at step 450, processor 404 determines whether the ambient light (or the change in ambient light) has been removed for a predetermined amount of time. If so, processor 404 advances to step 455, wherein processor 404 is reset in preparation for detecting ambient light (or a change in ambient light) with solar cell 402. If, at step 450, it is determined that the ambient light (or the change in ambient light) has not been removed, then processor 404 returns to step 445. Alternatively, the amount of time for which the ambient light (or the change in ambient light) has been removed need not be predetermined.

If, at step 425, it is determined that a transducer selection is stored in register 411, then processor 404 advances to step 460. At step 460, processor 404 determines whether the transducer selection that is stored in register 411 is for LED transducer 416. If the selection is for LED transducer 416, then processor 404 advances to step 435. If the selection is for LCD transducer 406, then processor 404 advances to step 465.

At step 465, processor 404 selects an LCD message from memory 410. At step 470, the message selected at step 465 is transmitted to LCD 406. LCD 406 displays the message in response to receiving the selected message and processor 404 advances to step 445. The message selected at step 465 may be transmitted for a predetermined amount of time, but the amount of time need not be predetermined.

As described above, at step 445 processor 404 determines whether switch 414 has been closed. If switch 414 has not been closed, then processor 404 advances to step 450. If switch 414 has been closed, then processor 404 advances to step 475. At step 475, the transducer selection previously stored in register 411 is replaced with the other transducer selection. That is, if LED transducer 416 was previously selected as the active transducer, then processor 404 would now select the LCD transducer 406 as the active transducer and store this selection in register 411, and visa versa. Processing proceeds thereafter as described above until finally ending at step 455.

Referring now to FIG. 1, a credit card 500 is illustrated in schematic form to depict yet another embodiment of the present invention. In this embodiment, a solar cell 502 is positioned in the upper left-hand portion of credit card 500. The solar cell 502 is configured to sense ambient light (or changes in ambient light), at which time it produces a signal. A processor 504 is positioned in the upper middle portion of credit card 500 and is in communication with solar cell 502. A battery 512 provides power to processor 504. Memory 510 is in communication with processor 504, thereby enabling the processor 504 to retrieve instructions and store data. A switch 514 is in communication with processor 504 for switching between displaying messages on an LCD 506 and emitting a light signal on LED 516.

The LCD 506 is positioned in the upper right-hand portion of credit card 500 and is in communication with processor 504. The LED 516 is positioned in the left-hand portion of credit card 500, between the solar cell 502 and the LCD 506. Each of the above elements is located outside of an embossing area 508.

In this embodiment, a receiver 518 in communication with processor 504 is configured to receive content and/or data from a content provider or transmitting source. A transmitter 520 in communication with processor 504 is configured to transmit a request for content and/or data to a content provider or transmitting source. While it is preferred to have both the receiver 518 and a transmitter 520, either of the two components may be included without the other. The receiver 518 and transmitter 520 are described herein as being included on a credit card embodiment similar to that of FIG. 9. However, it is understood that either or both of the receiver 518 and transmitter 520 may be used in any combination with the components (e.g., transducers, sensors, memory) and interconnections discussed herein.

Figure 11:
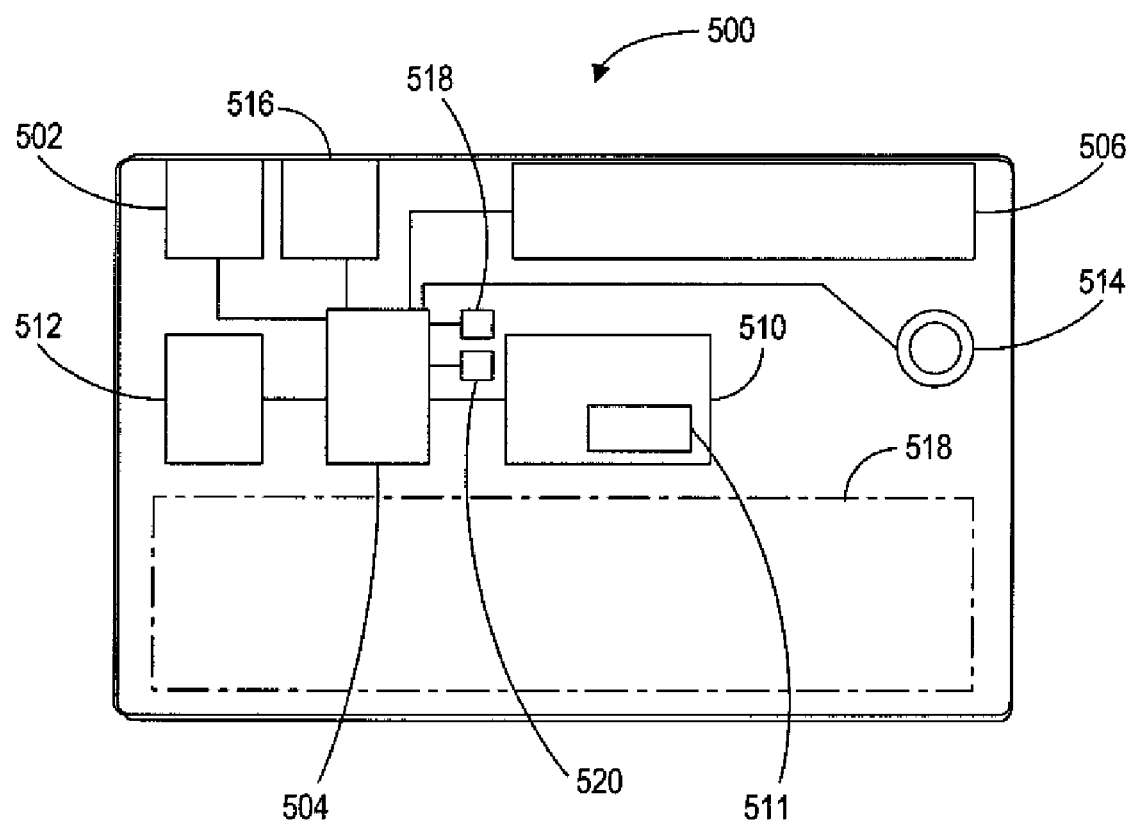
FIG. 11 is a front elevation view in schematic form of a credit card which includes an embodiment of the present invention including a receiver and a transmitter.
Figure 12A:
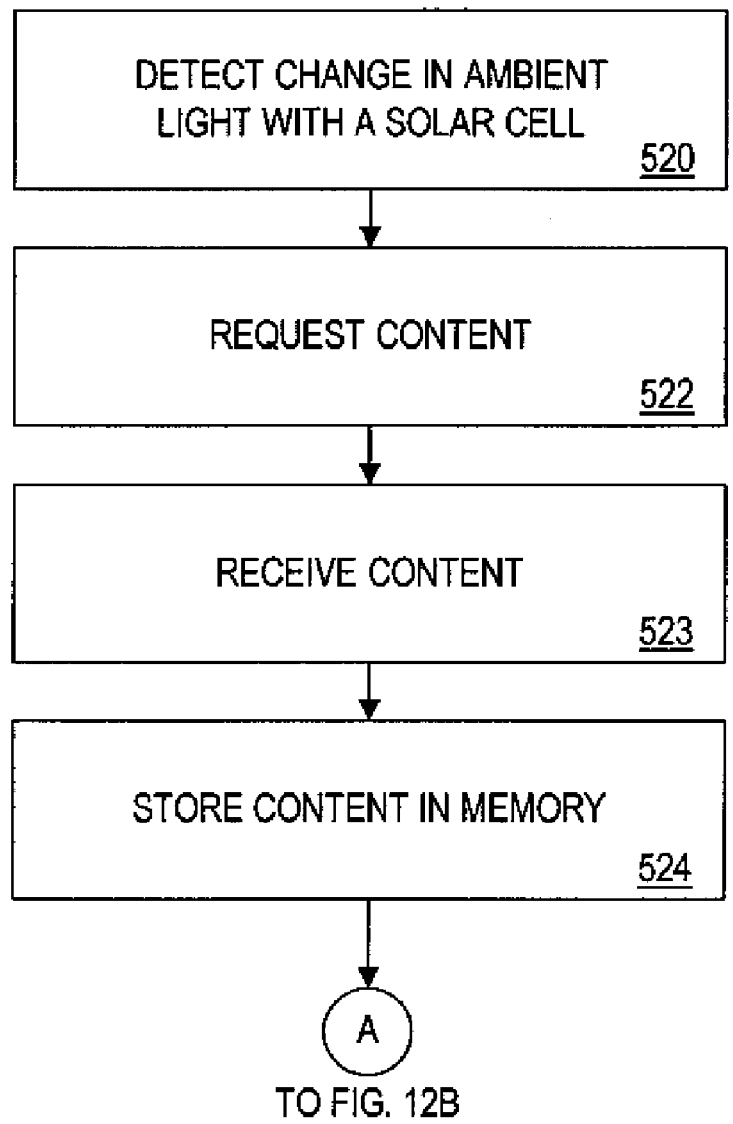
FIGS. 12A and 12B are a flow chart illustrating the operation of the credit card shown in FIG. 11.
Figure 12B:
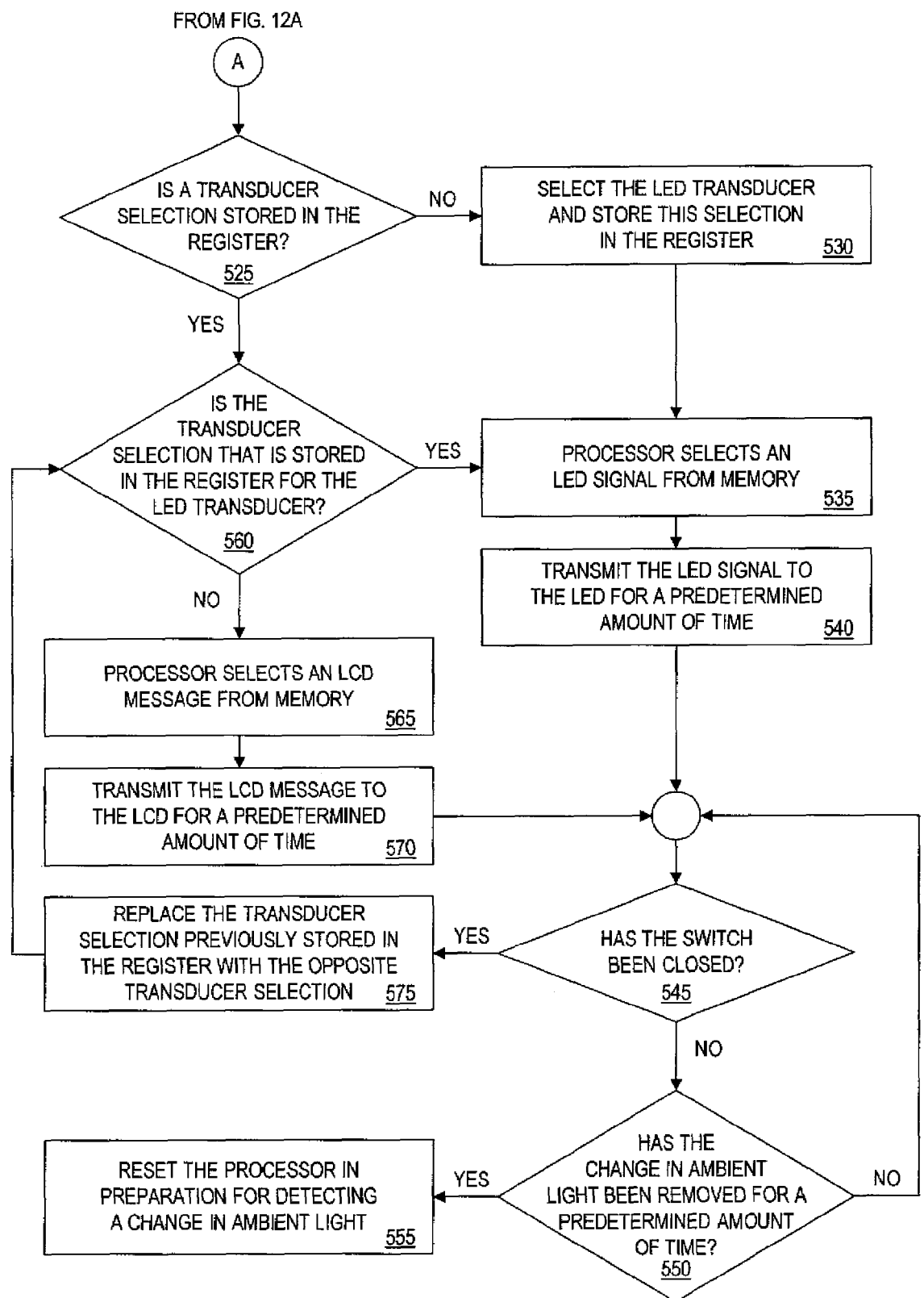

FIGS. 12A and 12B depict a flow chart illustrating the operation of credit card 500 shown in FIG. 11. The embodiment illustrated below is an example of a program that can be used with credit card 500 or any transaction card configured with a receiver, a transmitter, or both. Generally, the program enables a consumer to utilize receiver 518 and transmitter 520 to receive and request content from a transmitting source.

At step 520 (FIG. 12A), solar cell 502 detects ambient light (or a change in ambient light) and produces a signal. At step 522, processor 504 instructs transmitter 520 to request content. Alternatively, content may be requested at any time, or periodically, or at a request of the user. In this manner, time-sensitive content, such as weather or market information or a daily joke, may be updated. Processor 504 may request content corresponding to a specific type of transducer (e.g., LED, LCD), a specific type of content (e.g., weather information), or may request any type and combination of content and/or transducer signal described herein.

At step 523, receiver 518 receives data and/or signals corresponding to content. For example, the signals may correspond to updated sports, weather, traffic, market, and/or sales information. At step 524, the content is stored in memory 110. The content is preferably stored in memory 110 as a plurality of signals corresponding to one or more transducers of the credit card. Alternatively, the content is not stored in memory 110 and is provided in a "streaming" mode from the receiver.

At step 525 (FIG. 12B), processor 504 determines whether a transducer selection is stored in a register 511 of memory 510. If a transducer selection is not stored in register 511, then processor 504 advances to step 530. At step 530, the LED 516 transducer is selected and the selection is stored in register 511.

At step 535, processor 504 selects an LED signal from memory 510. Alternatively, the signal is not stored in memory 510 and is provided in a "streaming" mode from the receiver. At step 540, the signal selected at step 535 is transmitted to LED 516. The signal may be transmitted for a predetermined amount of time, but the amount of time need not be predetermined. LED 516 emits light in response to the selected signal.

At step 545, processor 504 determines whether switch 514 has been closed. If switch 514 has not been closed, then processor 504 advances to step 550. In a preferred embodiment, at step 550, processor 504 determines whether the ambient light (or the change in ambient light) has been removed for a predetermined amount of time. If so, processor 504 advances to step 555, wherein processor 504 is reset in preparation for detecting ambient light (or a change in ambient light) with solar cell 502. If, at step 550, it is determined that the ambient light (or the change in ambient light) has not been removed, then processor 504 returns to step 545. Alternatively, the amount of time for which the ambient light (or the change in ambient light) has been removed need not be predetermined.

If, at step 525, it is determined that a transducer selection is stored in register 511, then processor 504 advances to step 560. At step 560, processor 504 determines whether the transducer selection that is stored in register 511 is for LED transducer 516. If the selection is for LED transducer 516, then processor 504 advances to step 535. If the selection is for LCD transducer 506, then processor 504 advances to step 565.

At step 565, processor 504 selects an LCD message from memory 510. Alternatively, the signal is not stored in memory 510 and is provided in a "streaming" mode from the receiver. At step 570, the message selected at step 565 is transmitted to LCD 506. LCD 506 displays the message in response to receiving the selected message and processor 504 advances to step 545. The message selected at step 565 may be transmitted for a predetermined amount of time, but the amount of time need not be predetermined.

As described above, at step 545 processor 504 determines whether switch 514 has been closed. If switch 514 has not been closed, then processor 504 advances to step 550. If switch 514 has been closed, then processor 504 advances to step 575. At step 575, the transducer selection previously stored in register 511 is replaced with the other transducer selection. That is, if LED transducer 516 was previously selected as the active transducer, then processor 504 would now select the LCD transducer 506 as the active transducer and store this selection in register 511, and visa versa. Processing proceeds thereafter as described above until finally ending at step 555.

As described herein, various embodiments of the present invention provide for a transaction card to receive content from a user, merchant, content provider and/or transmitting source. In addition to content, a transaction card may receive other types of information and signals. For instance, a transaction card may be configured to receive location information from a GPS system. In another example, a transmitting source may transmit a signal that identifies one or more merchants (e.g., in a mall) and/or identifies content (e.g., an identifier that uniquely identifies a message or type of content stored on the transaction card).

Figure 13:
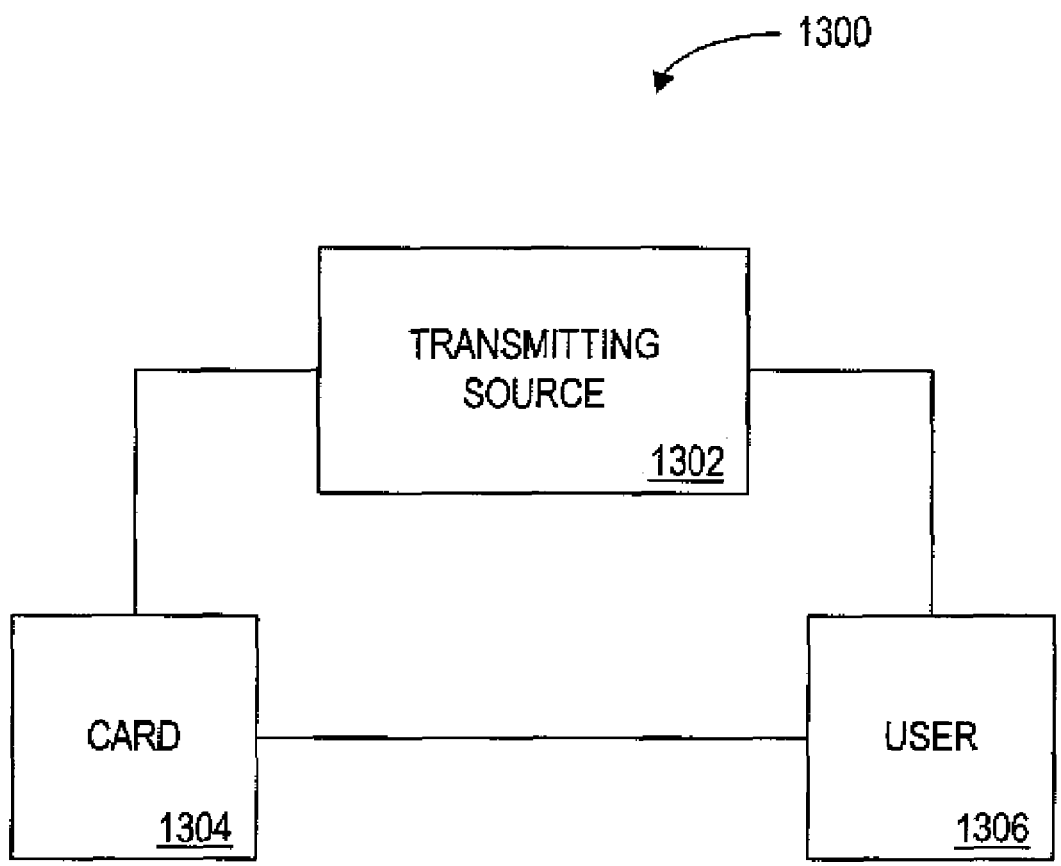
FIG. 13 is a block diagram of an embodiment of a system according to the present invention.

An example embodiment of a system 1300 of the present invention is depicted in FIG. 13. The present invention can be configured to work as a system 1300 in a network environment including a transmitting source 1302 (e.g., a merchant, a content provider, a central controller) that is in communication, via a communications network, with one or more cards 1304 and/or one or more users 1306. The transmitting source 1302 may communicate with the cards and/or users directly or indirectly, via a wired or wireless medium such as the Internet, LAN, WAN or Ethernet, Token Ring, or via any appropriate communications means or combination of communications means. The users may communicate with the transmitting source 1302, for example, using a personal computer or other type of device, such as those based on the Intel® Pentium® processor, that are adapted to communicate with the transmitting source 1302. Any number and type of cards 1304 and users 1306 may be in communication with the transmitting source 1302. As depicted in FIG. 13, a user 1306 may be in communication with a card 1304 (e.g., for entering content via a keypad or other means).

Communication between the cards 1304, users 1306 and the transmitting source 1302 may be direct or indirect, such as over the Internet through a Web site maintained by computer on a remote server or over an online data network including commercial online service providers, bulletin board systems and the like. In yet other embodiments, a card 1304 and/or a user 1306 may communicate with one another and/or the transmitting source 1302 over RF, cable TV, satellite links and the like.

Some, but not all, possible communication networks that may comprise the network or be otherwise part of the system 1300 include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In some embodiments, a transmitting source 1302 may not be necessary and/or may not be preferred. For example, as discussed herein, various embodiments may be practiced on the card 1304 alone or by interaction of a user 1306 with the card 1304. In some embodiments, the card 1304 may not be necessary and/or may not be preferred. For example, as discussed herein, some embodiments may comprise communication between the user 1306 and the transmitting source 1302 (e.g., the user may submit content preferences to a content provider via a Website).

ADDITIONAL EMBODIMENTS

Those skilled in the art will readily recognize that a number of alterations can be made to the embodiments described above without departing from the scope of the present invention. For example, a transaction card including the basic embodiment of the present invention as described above and illustrated in FIG. 3 can utilize a speaker, such as a piezoelectric vibrator, as a transducer for emitting sound stored in machine readable form in a memory. The speaker can emit a sound, e.g., a chirping sound, when a consumer opens his wallet. A variation of this embodiment includes utilizing magnetic strip 24 (FIG. 2) as a sensor and configuring the device to emit a sound or a message when the transaction card is passed through a transaction card reader.

As another example, a transaction card including the basic embodiment of the present invention as described above and illustrated in FIG. 3 can utilize a pressure sensor that detects when a wallet has been opened. Thus, when the wallet is opened and the sensor detects that the pressure has been removed, it activates, for example, an LCD, LED, or speaker.

Embodiments of the invention are not limited to the above-described types of transaction cards. For example, the invention may also be used with casino player tracking cards, medical monitoring cards, prepaid calling cards, frequent shopper cards, or check cashing cards.

In some alternative embodiments, use of the card at a card reader device (e.g., at a point-of-sale terminal) may trigger output of a message or other content. For example, when the user or a cashier uses the card at the card reader device during a transaction at the point-of-sale, the interaction of the card with the card reader device may trigger output of content (e.g., a joke). In this way, use of the card may be entertaining and/or informative to the user, may draw the attention of the user, and may draw the attention of other people to the card.

As discussed above, some embodiments allow a user to establish one or more preferences. In at least one embodiment, a user may configure preferences for, among other things, content, delivery of content to the transaction card (e.g., from a content provider) and/or output of content by the transaction card. In one example of a preference, a user may specify one or more merchants from whom the user would like to receive messages (e.g., discounts, coupons or other promotional information). In another example, a user may specify a preference for when the user would prefer to receive content (e.g., never before 10 a.m.). In another example, the user may specify a preference for how often the transaction card should request and/or receive content (e.g., from a content provider).

In one embodiment, the user may be able to configure one or more preferences via a Website (e.g., hosted by or on behalf of a content provider). The content provider may determine, for example, what types of content to transmit to the card and/or when to send content based on the preferences. In some embodiments, an indication of one or more of the preferences submitted to a content provider may be transmitted to the transaction card. The processor of the transaction card may store and/or use the preferences, for example, in determining when to provide content to the user and/or what type of content to provide. In some embodiments the transaction card may be configured to receive preferences from the user (in lieu of or in addition to receiving preferences from a transmitting source).

According to some embodiments, one or more conditions or rules may be established for enabling the output of content (or of some types of content). For example, content may be stored on a transaction card but the card will not output the content until one or more conditions are met. In some embodiments, content may be or may become "locked" or disabled and the user will have to fulfill some condition(s) in order to unlock the content for output. For instance, if the user does not use the card (e.g., in a transaction) for a predetermined period of time, the content may be locked, and the user may have to fulfill some type of obligation or otherwise meet some condition in order to activate output again. Some examples of conditions for enabling or unlocking output of content may include, without limitation:

a) activating an account associated with the transaction card (e.g., a credit card account);
b) using the card in a transaction;
c) meeting a minimum usage requirement (e.g., a minimum amount charged);
d) using the card with a required frequency (e.g., once a week);
e) taking the card to a particular location (e.g., to a participating mall); and
f) subjecting the card to a minimum number of physical changes.

Various other types of conditions may be apparent to those of skill in the art upon reading the present disclosure.

According to some embodiments, a merchant may be a content provider. For example, a merchant may transmit content to a transaction card brought into the merchant's store (or within a transmission range).

In some embodiments, the merchant may transmit a signal (that may or may not include content) to a transaction card. Based on the signal, the transaction card may output content and/or determine what content to output. For example, the merchant may transmit a signal that identifies the merchant, identifies a type of content and/or identifies a message stored on the transaction card (e.g., "Triple frequent flyer miles with every purchase over $25!"). If a physical change is detected, the processor of the transaction card outputs content based on the physical change and/or the received signal. In one alternative embodiment, the signal may instruct the transaction card to suppress output of particular content (or suppress all output).

Figure 14:
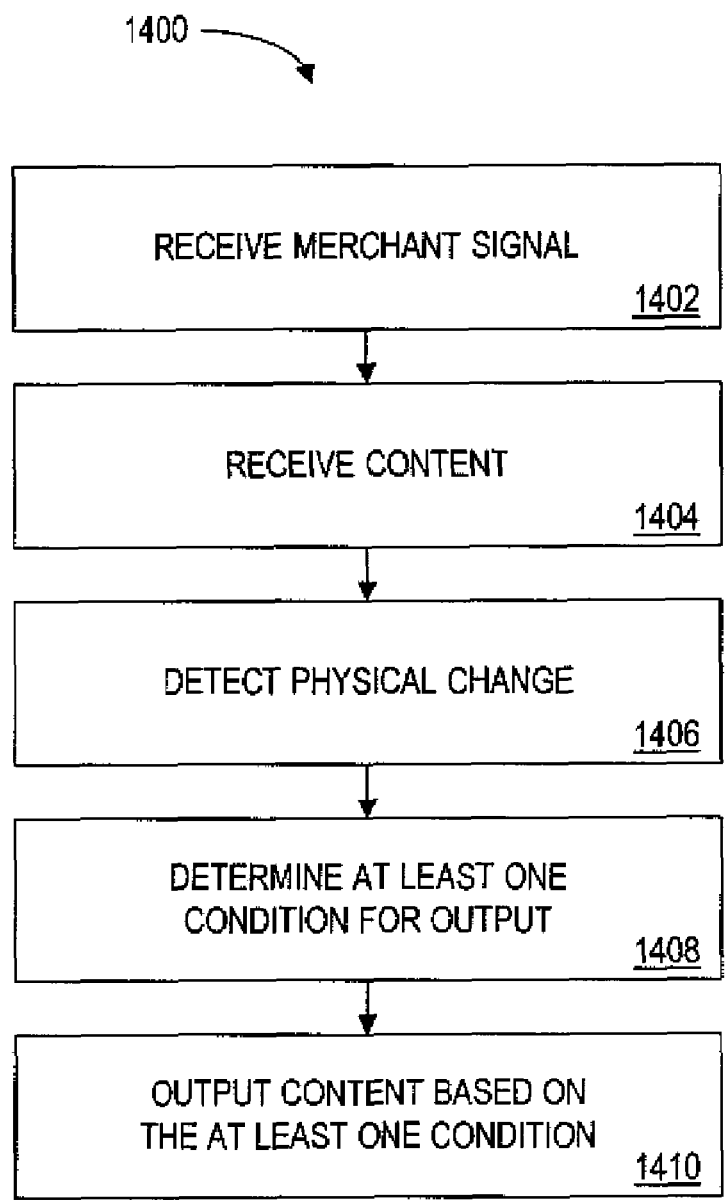
FIG. 14 is a flow chart illustrating the operation of embodiments according to the invention.

Referring to FIG. 14, a flow chart 1400 is depicted that represents some embodiments of the present invention. It must be understood that the particular arrangement of elements in the flow chart 1400 of FIG. 14, as well as the number and order of example steps of other various methods discussed herein, is not meant to imply a fixed order, sequence, quantity, and/or timing to the steps. Embodiments of the present invention can be practiced in any order, sequence, and/or timing that is practicable. Likewise, the labels used to reference the individual steps of the methods are not meant to imply a fixed order, sequence, quantity, and/or timing to the steps.

In general terms and still referring to FIG. 14, method steps of some embodiments of the present invention may be summarized as follows. In step 1402, a merchant signal is received. In step 1404, content is received. In step 1406, a physical change is detected. In step 1408, at least one condition for output is determined. In step 1410, content is output based on the at least one condition. As indicated above, in some embodiments these steps may be performed in a different order, and more, fewer, and/or alternative steps may be used as well.

In the discussion that follows, each of these exemplary steps will be discussed in greater detail. Note that not all of these steps are required to perform the methods of the present invention and that additional and/or alternative steps are also discussed below. Also note that the above general steps represent features of only some of the embodiments of the present invention. Such steps may be combined and/or subdivided in any number of different ways so that methods of the present invention include more or fewer actual steps. For example, in some embodiments additional steps may be added to update and maintain databases (e.g., a content database). It is not necessary, however, to use databases in all embodiments of the invention. In some embodiments, a described step may be performed by or with respect to any number of devices or entities. For example, a step may be subdivided into sub-steps, some of which are performed by one device (e.g., a transmitting source), and some of which are performed by or otherwise involve a different device (e.g., a transaction card). In other words, the methods of the present invention may contain any number of steps performed by any number of entities that are practicable to implement the various different inventive processes described herein.

In step 1402, a merchant signal is received. As described herein, some embodiments provide for a signal to be received by the transaction card, the signal being provided by or on behalf of a merchant. In one embodiment, the signal identifies a merchant. In some embodiments, the signal includes content, but this is not required. In one embodiment, the signal represents a GPS or other signal useful in identifying a location of the transaction card. For instance, the signal may not directly indicate a merchant, but the processor of the transaction card may be able to identify one or more merchants based on a received location signal. For example, the transaction card may store a database of merchants and their respective locations. In some embodiments, the signal need not identify a particular merchant directly or indirectly, but may satisfy a condition for output of content. In some embodiments, the signal may be transmitted when the transaction card is detected. In other embodiments, the signal simply may be broadcast (e.g., in and/or around a store or mall). Various types of devices for transmitting and receiving different types of signals are discussed herein; still others will be readily apparent to those of skill in the art in light of the present disclosure.

In step 1404, the transaction card receives content. Various ways of receiving content, and types of content, are described herein. As noted above, the merchant signal may include content. In other embodiments, content may be provided by a content provider, the user, or some other transmitting source.

In step 1406, a physical change is detected. Various types of physical changes and means for detecting them are discussed herein. For example, a transaction card may detect a change in ambient light (e.g., when the user opens her purse or wallet).

In step 1408, at least one condition for output is determined. As discussed herein, conditions may be established for when, where, how, and/or what content is output (e.g., based on time of day, location, user preferences, etc.). Some content may be associated with one or more respective conditions, as discussed herein.

In step 1410, the transaction card outputs content based on the at least one condition. For example, in one embodiment, the transaction card receives the merchant signal and stores an indication that the signal was received. The transaction card determines conditions for outputting content associated with the merchant. For instance, if the merchant signal indicates that the user has entered a sporting goods store, the transaction card may identify various conditions for output associated with that store. Alternatively, or in addition, the processor may identify one or more types of content associated with the merchant. After a physical change is detected (step 1406), the transaction card outputs content based on the at least one determined condition. For example, the content may be determined and/or output based on the type of physical change detected and the merchant, the time of day and the location, or a user preference and marketing information received from the merchant (e.g., "Buy one book get one free during the next twenty minutes!"). In some embodiments, receiving a merchant signal may unlock content stored on a transaction card. Then, when the card detects a physical change, the content may be output to the user.

While the device and method disclosed herein has been described with respect to various specific embodiments, those skilled in the art will readily appreciated that various modifications, changes, and enhancements may be made thereto without departing from the spirit and scope of the invention as defined by the appended claim.

What is claimed is:

1. A device comprising:
    a sensor operable to detect a physical change and to produce a signal indicating the detected physical change;
    a transducer operable to produce an output signal promoting use of a transaction card;
    a processor operable to receive the signal produced by the sensor and operable to activate the transducer to produce the output signal; and
    a memory in communication with the processor, the memory storing instructions configured to direct the processor to:
        determine at least one condition for producing an output signal; and
        in response to receiving the signal produced by the sensor indicating detection of the physical change, activating the transducer to produce the output signal, based on the at least one condition.

2. The device of claim 1, in which the produced output signal is based on at least one of:
    sports information,
    market information,
    sales information,
    lottery information,
    schedule information,
    travel information,
    a joke,
    an image,
    a video,
    a quotation,
    a display pattern,
    a song,
    a horoscope,
    exchange rate information, or
    weather information.

3. The device of claim 1, in which the instructions are further configured to direct the processor to deactivate the transducer.

4. The device of claim 1, in which the device further comprises a receiver for receiving content.

5. The device of claim 4, in which the instructions are further configured to direct the processor to receive content via the receiver and to store received content in the memory.

6. The device of claim 4, in which the content is received from a transmitting source.

7. The device of claim 4, in which the content is received from a transmitter associated with a merchant.

8. The device of claim 4, in which the content is received from a user of the transaction card.

9. The device of claim 4, in which the content is received from a second transaction card.

10. The device of claim 4, in which the content is received from a content provider.

11. The device of claim 4, in which the produced output signal comprises the received content.

12. The device of claim 1, in which the instructions are further configured to select content stored in the memory based on the type of detected physical change, and in which the produced output signal comprises the selected content.

13. The device of claim 1, in which the detected physical change comprises a change in ambient light.

14. The device of claim 1, in which the detected physical change comprises a change in pressure applied to the card.

15. The device of claim 1, in which the detected physical change comprises use of the transaction card at a card reader.

16. The device of claim 1, in which the detected physical change comprises use of the transaction card at a point of sale terminal.

17. The device of claim 1, in which the detected physical change comprises a location of the device.

18. The device of claim 1, in which the detected physical change comprises a change in orientation of the transaction card.

19. The device of claim 1, in which the detected physical change comprises a change in ambient sound.

20. The device of claim 1, in which the instructions are further configured to select content stored in the memory, and in which the produced output signal comprises the selected content.

21. The device of claim 1, in which the instructions are further configured to lock content stored in the memory.

22. The device of claim 1, in which the instructions are further configured to unlock content stored in the memory if the at least one condition has been satisfied, and
in which the produced output signal comprises the unlocked content.

23. The device of claim 22, in which the at least one condition comprises use of the transaction card for a transaction.

24. The device of claim 22, in which the at least one condition comprises activation of an account associated with the transaction card.

25. The device of claim 22, in which the at least one condition comprises a minimum amount charged by a user using the transaction card.

26. The device of claim 22, in which the at least one condition comprises use of the transaction card by a user with a predetermined frequency.

27. The device of claim 22, in which the at least one condition comprises use of the transaction card by a user at a predetermined location.

28. The device of claim 22, in which the at least one condition comprises use of the transaction card by a user at a predetermined location.

29. The device of claim 22, in which the at least one condition comprises detecting of a predetermined minimum number of physical changes.

30. An apparatus comprising:
a processor; and
a memory in communication with the processor, the memory storing instructions configured to direct the processor to:
detect at a transaction card a physical change;
determine at least one condition for producing an output signal; and
in response to sensing the physical change, activate a transducer of the transaction card to produce an output signal to attract the attention of a user, in which the output signal is based on the at least one condition.

31. The apparatus of claim 30, in which the instructions are further configured to direct the processor to receive a signal from a merchant.

32. The apparatus of claim 31, in which activating the transducer comprises:
in response to sensing the physical change, activating the transducer of the transaction card to produce the output signal based on the at least one condition and the signal from the merchant.

33. The apparatus of claim 31, in which the signal from the merchant unlocks content stored on the transaction card.

34. The apparatus of claim 30, in which the instructions are further configured to direct the processor to unlock content stored on the transaction card.

35. A computer readable medium storing instructions configured to direct a processor to:
detect at a transaction card a physical change;
determine at least one condition for producing an output signal; and
in response to sensing the physical change, activate a transducer of the transaction card to produce an output signal to attract the attention of a user, in which the output signal is based on the at least one condition.

36. The computer readable medium of claim 35, in which the instructions are further configured to direct the processor to receive a signal from a merchant.

37. The computer readable medium of claim 36, in which activating the transducer comprises:
in response to sensing the physical change, activating the transducer of the transaction card to produce the output signal based on the at least one condition and the signal from the merchant.

38. The computer readable medium of claim 36, in which the instructions are further configured to direct the processor to unlock content stored on the transaction card based on the signal from the merchant.

39. The computer readable medium of claim 35, in which the instructions are further configured to direct the processor to unlock content stored on the transaction card.

\* \* \* \* \*